UNITED STATES PATENT OFFICE.

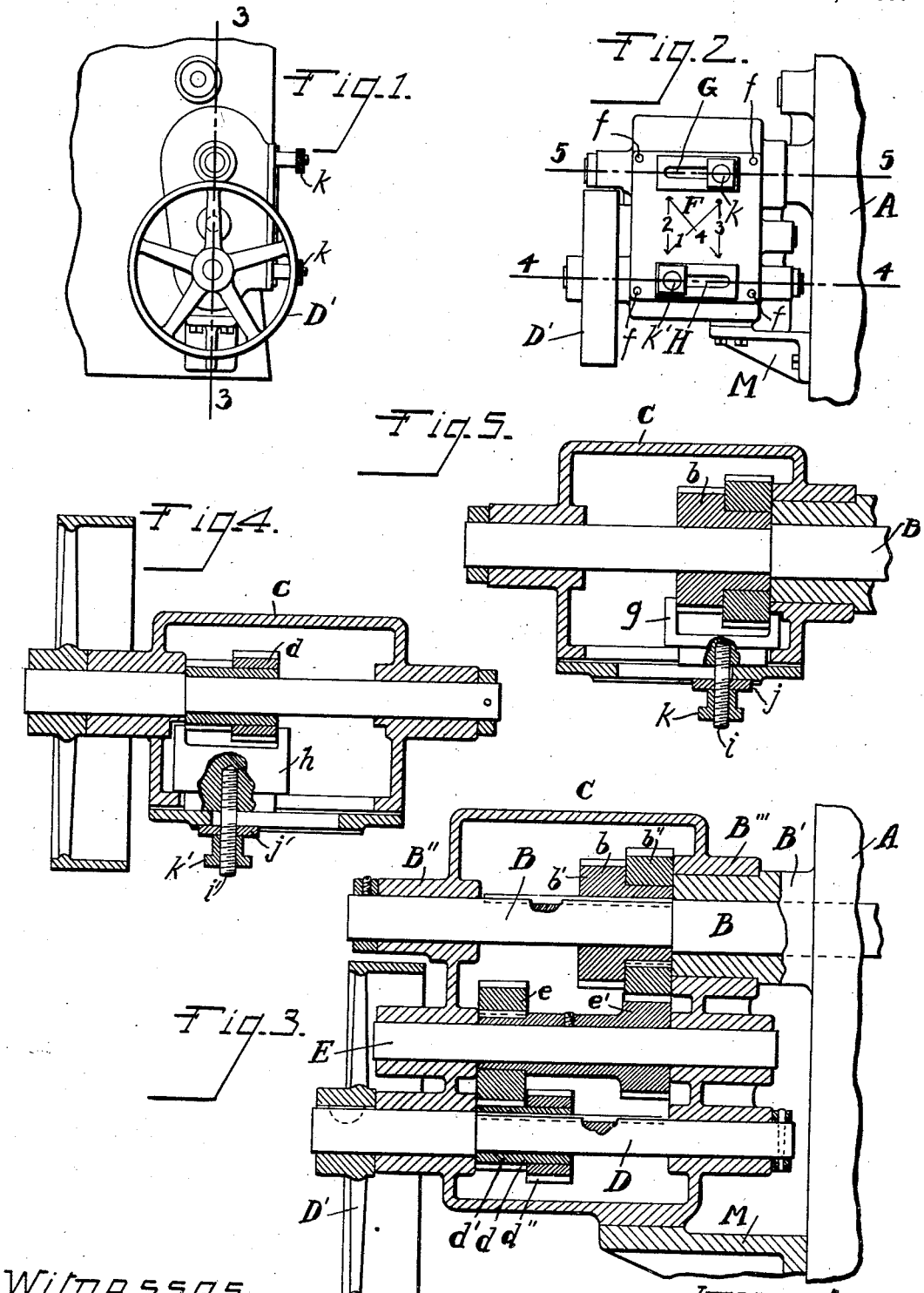

LARZ W. ANDERSON AND ARISTIDES R. MURRAY, OF CINCINNATI, OHIO.

CHANGE-SPEED GEARING.

943,621.  Specification of Letters Patent.  Patented Dec. 14, 1909.

Application filed January 3, 1908. Serial No. 409,215.

*To all whom it may concern:*

Be it known that we, LARZ W. ANDERSON and ARISTIDES R. MURRAY, both citizens of the United States, and residents of Cincinnati, in the county of Hamilton and State of Ohio, have invented certain new and useful Improvements in Change-Speed Gearing, of which the following is a full, clear, and exact description, reference being had to the accompanying drawings, which form part of our specification.

Our invention relates to change speed gearing and has for its object the production of a simple and economical arrangement of gearing whereby several speeds may be readily and easily produced.

It also involves a new and improved index mechanism whereby the several speeds provided by the gearing may be obtained with accuracy and precision.

In the drawings;—Figures 1 and 2 are respectively a side and rear elevation of the box containing our improved change gearing; Fig. 3 is a vertical section through the same on an enlarged scale on the line 3—3 of Fig. 1; Fig. 4 is a horizontal section through Fig. 2 on the line 4—4 thereof; and Fig. 5 is a similar section on the line 5—5 of Fig. 2. Figs. 3, 4 and 5 are all drawn on the same scale.

A indicates a portion of the machine to which the speed box is to be attached. B is the initial shaft of said machine, having bearing in a journal B' formed integral with the frame of the machine.

C is the speed box. The shaft B projects through the speed box, which is provided with a suitable housing or journal B'' to support it.

The speed box is supported on the journal B', prolonged for the purpose, the speed box having a housing B''' formed in its wall to embrace it, and by a bracket M, bolted to its under side and to the frame of the machine.

D is the driving shaft, and E a supplemental shaft, both suitably journaled in housings formed in the side walls of the speed box C.

D' is a pulley to which power is applied in order to drive the shaft D. A double slip gear $d$, having sections $d'$, $d''$, is feathered to the shaft D. Gears $e$, $e'$, which are keyed together, are keyed to shaft E. The one gear $e$ is of a diameter adapted to mesh with the one section $d'$ of the slip gear $d$, while the gear $e'$ is of a diameter adapted to mesh with the section $d''$. The two gears, $e$, $e'$, are separated by a distance slightly greater than the total width of the slip gear $d$. A double slip gear $b$ having the sections $b'$ and $b''$ is feathered to the shaft B, and said sections are of a diameter adapted to mesh respectively, $b''$ with $e'$ and $b'$ with $e$. The total width of slip gear $b$ is substantially the same as the total width of the slip gear $d$.

The speed box contains a square opening in front to permit of access to the gears; but said opening is normally closed by an index plate F, which is secured to the speed box in any convenient manner, as by the screws $f$. Slots G and H are formed in the index plate opposite the shafts B and D, and parallel thereto. Yokes $g$ and $h$ travel respectively in these slots, being supported by screws, washers, and knurled hand nuts, the same being lettered respectively, $i$, $j$, and $k$, and $i'$, $j'$ and $k'$. The yoke $h$ embraces the double slip gear $d$ and the yoke $g$ embraces the double slip gear $b$. It is apparent that by means of the hand nuts the yokes, and with them, the slip gears, may be clamped in the desired position. The hand nuts also serve to move the slip gears to the desired position, as well as to clamp them in place.

It is apparent from the drawings and the description, that by the arrangement described four speeds may be obtained. In order to properly indicate these speeds, we have provided the index plate with numerals and arrows indicated in Fig. 2. The arrangement of this index in the particular instance of our invention described is as follows:—

The four speeds, beginning with the lowest, and ending with the highest, are numbered respectively, 1, 2, 3, and 4. Lines are arranged connecting each position of the hand nuts $k$ and $k'$ with the arrow heads at their ends, and each of these lines has a number as indicated. When the hand nuts are placed at the opposite ends of one of these lines, the speed indicated by the numeral will be produced. For example, in the device as illustrated, the hand nuts are in the position to give the first or lowest speed, being at opposite ends of the line marked 1. To produce the second speed, the hand nut $k'$ would be left where it is and the nut $k$ be brought to the end of the line marked 2. This index card thus furnishes a very sure and simple method of producing the speed desired.

Having thus described our invention what we desire to claim as new and to cover by Letters Patent, is:—

In combination with the initial shaft of a machine and a journal for said shaft projecting beyond the outer wall of said machine, a speed box mounted on said journal, a bracket secured to the wall of said machine supporting said speed box, a driving shaft, and a shaft intermediate of said shafts, said speed box having bearings formed therein for said shafts, and gearing mounted on said three shafts with mechanism adapted to change the relations of said gearing, substantially as and for the purpose described.

LARZ W. ANDERSON.
ARISTIDES R. MURRAY.

Witnesses:
P. G. MARCH,
SAML. WHITE.